3,361,477
VEHICLE WITH TANDEM DUMP BODIES, DUMPABLE BY A SINGLE DUMPING MECHANISM
Charlie C. Pitts, Wichita Falls, Tex. (P.O. Box 13098, San Antonio, Tex. 78213)
Filed July 5, 1966, Ser. No. 562,815
21 Claims. (Cl. 298—8)

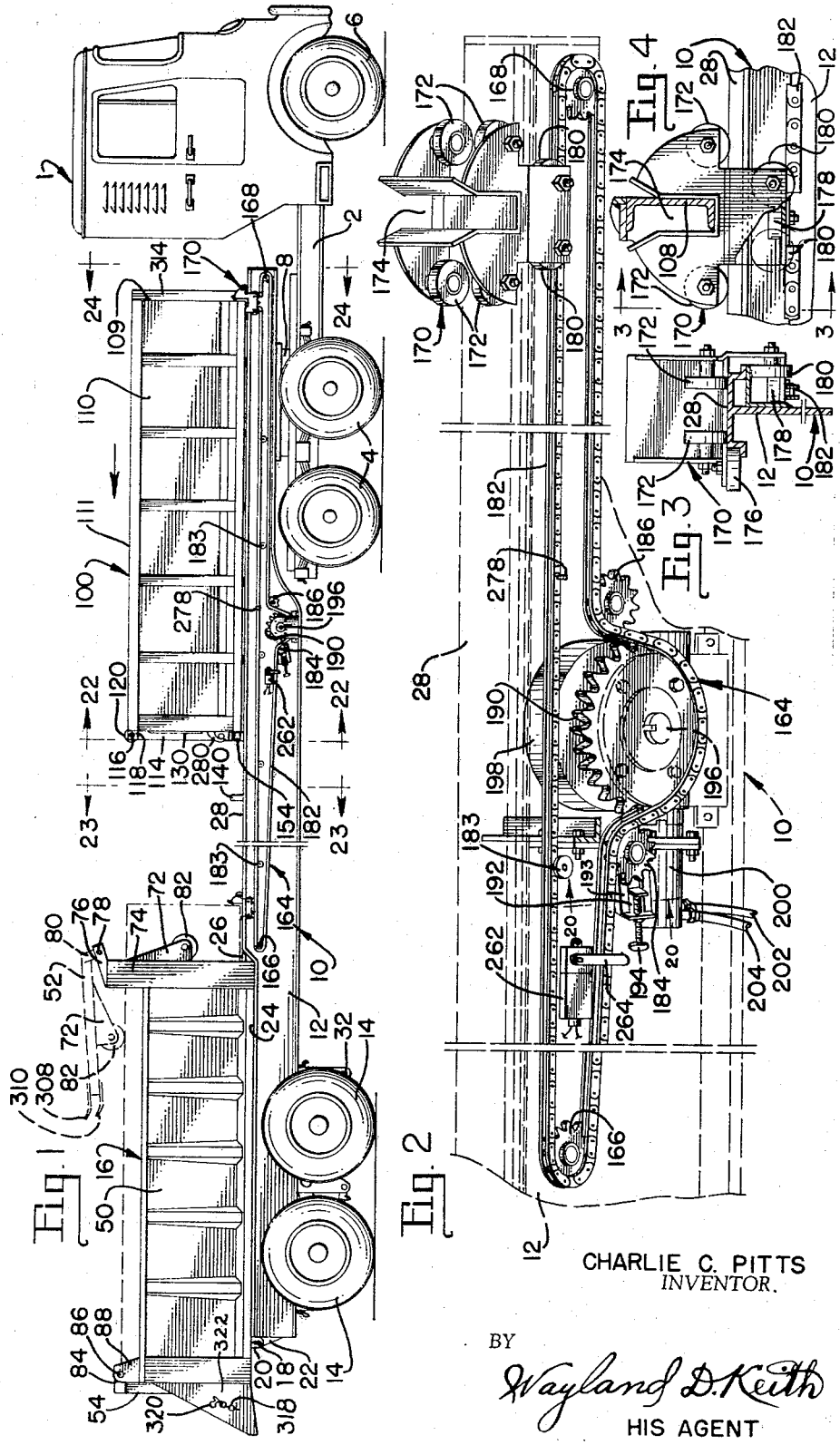

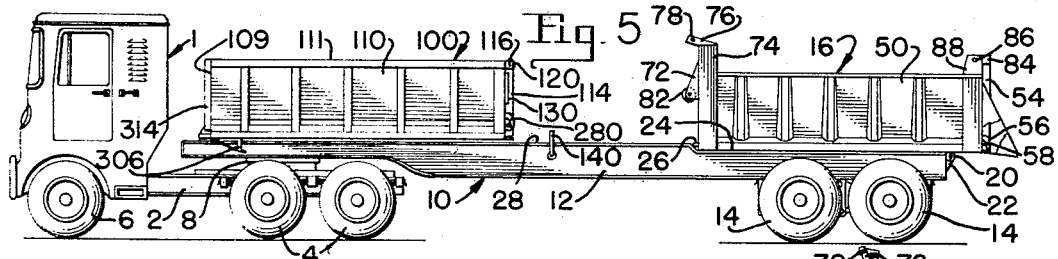
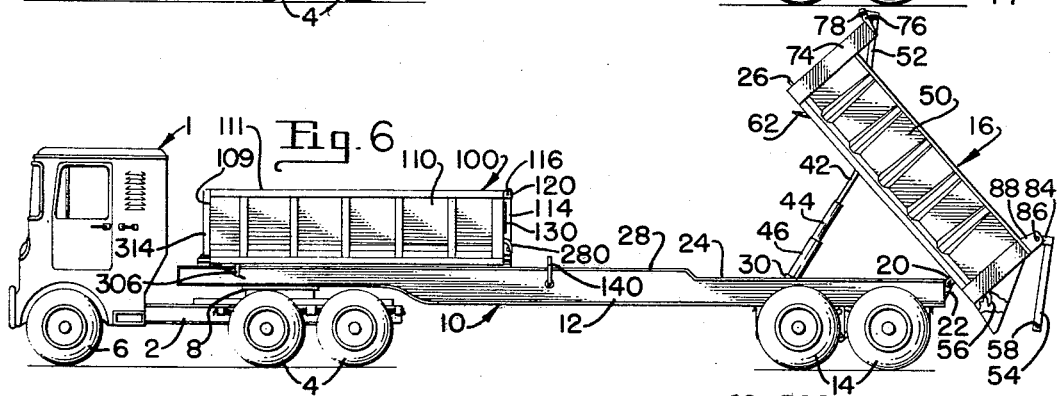
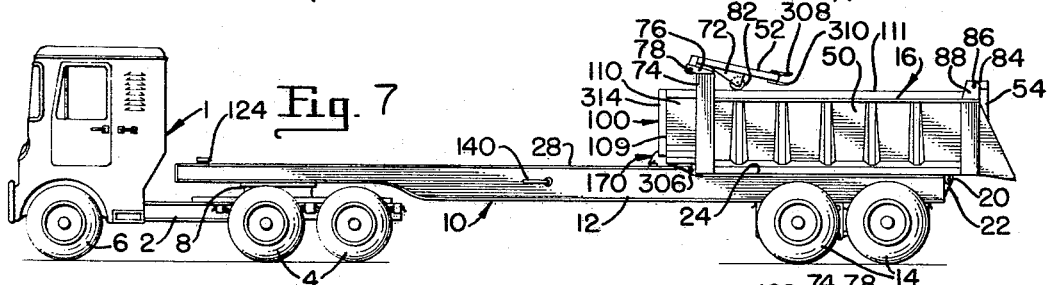
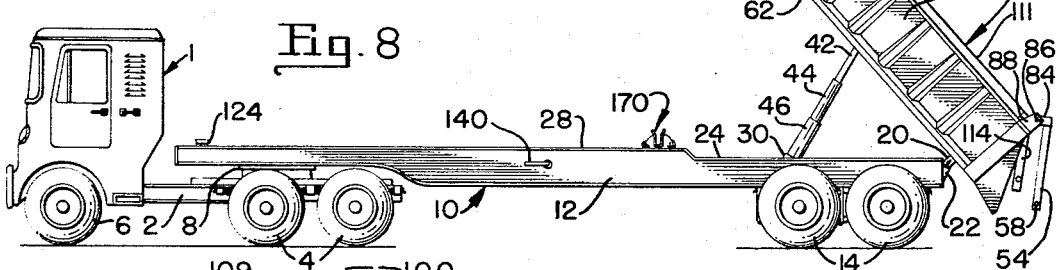
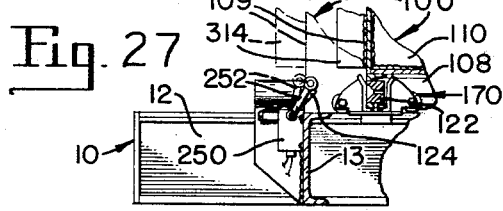
CHARLIE C. PITTS
*INVENTOR.*
BY
*Wayland D. Keith*
HIS AGENT

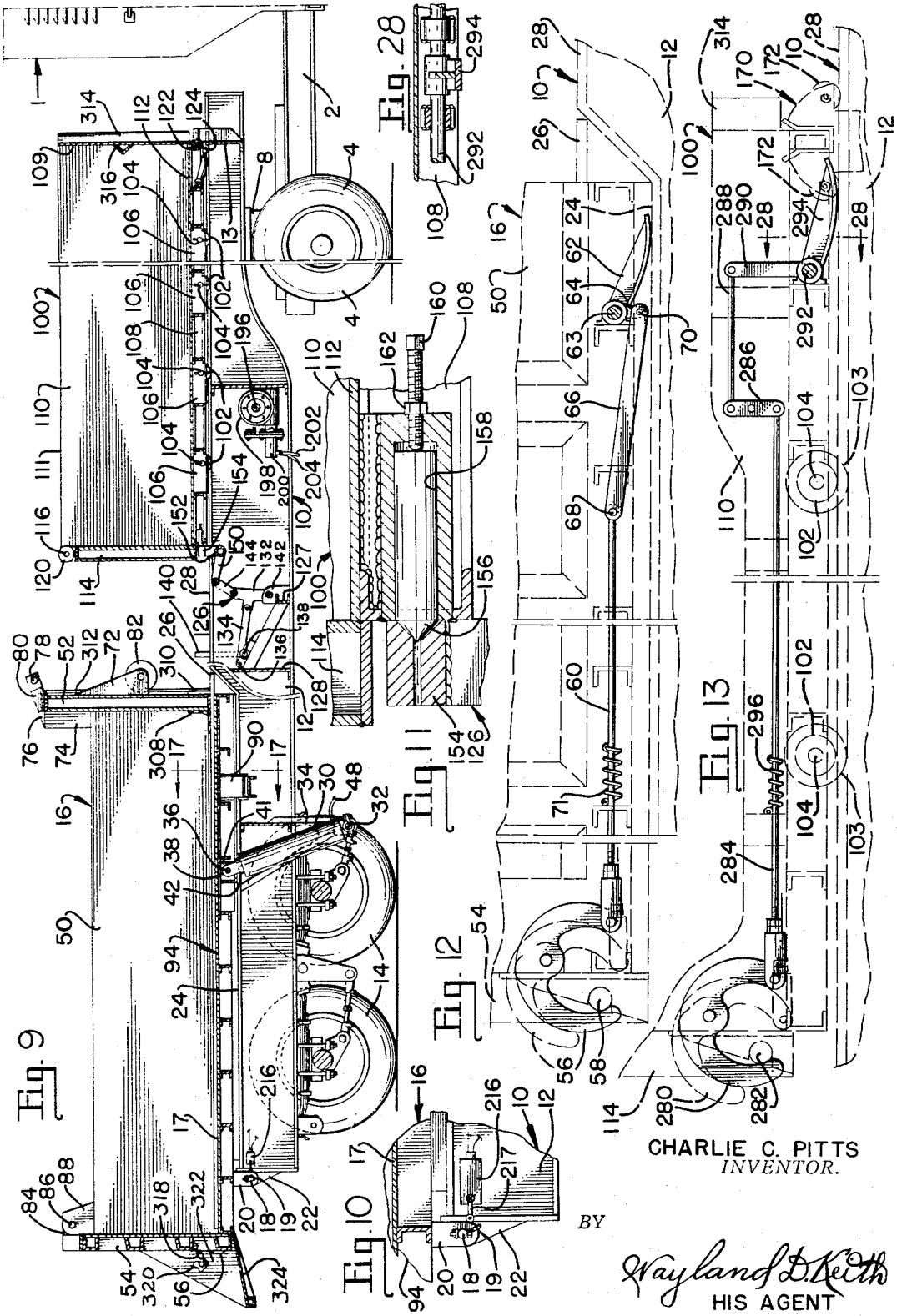

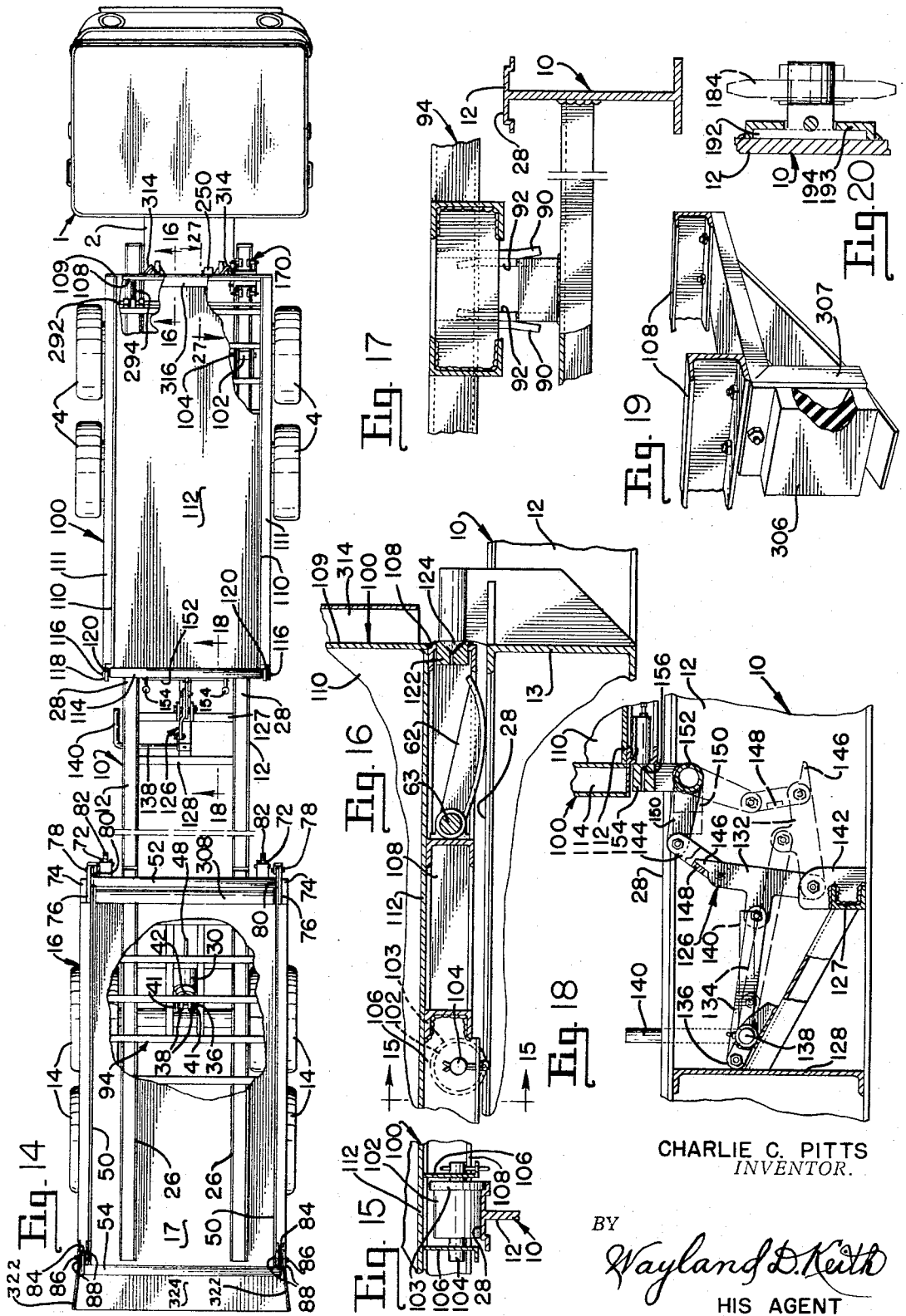

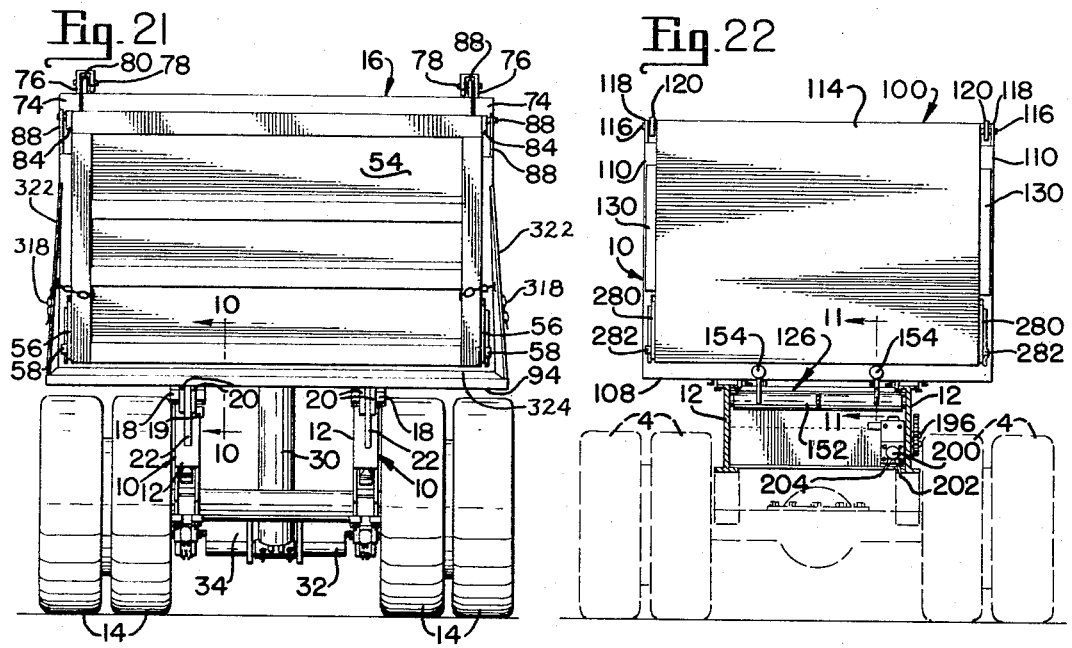
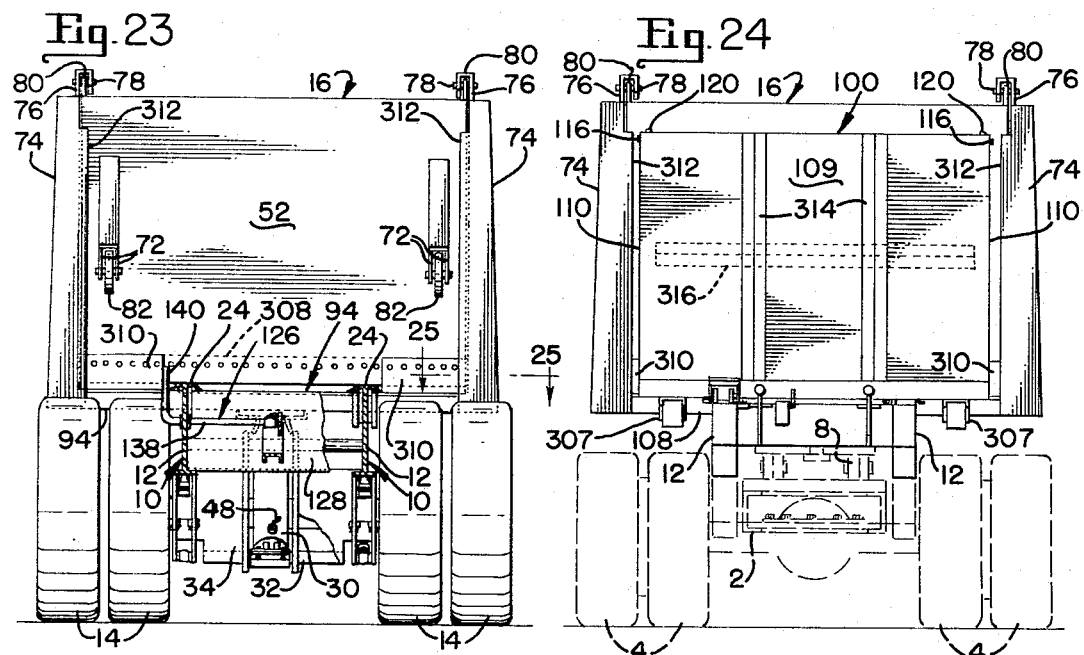
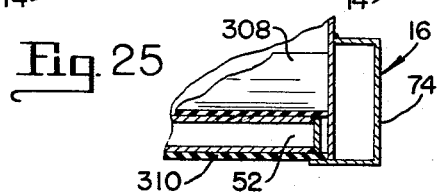
CHARLIE C. PITTS
*INVENTOR.*
BY
Wayland D. Keith
HIS AGENT

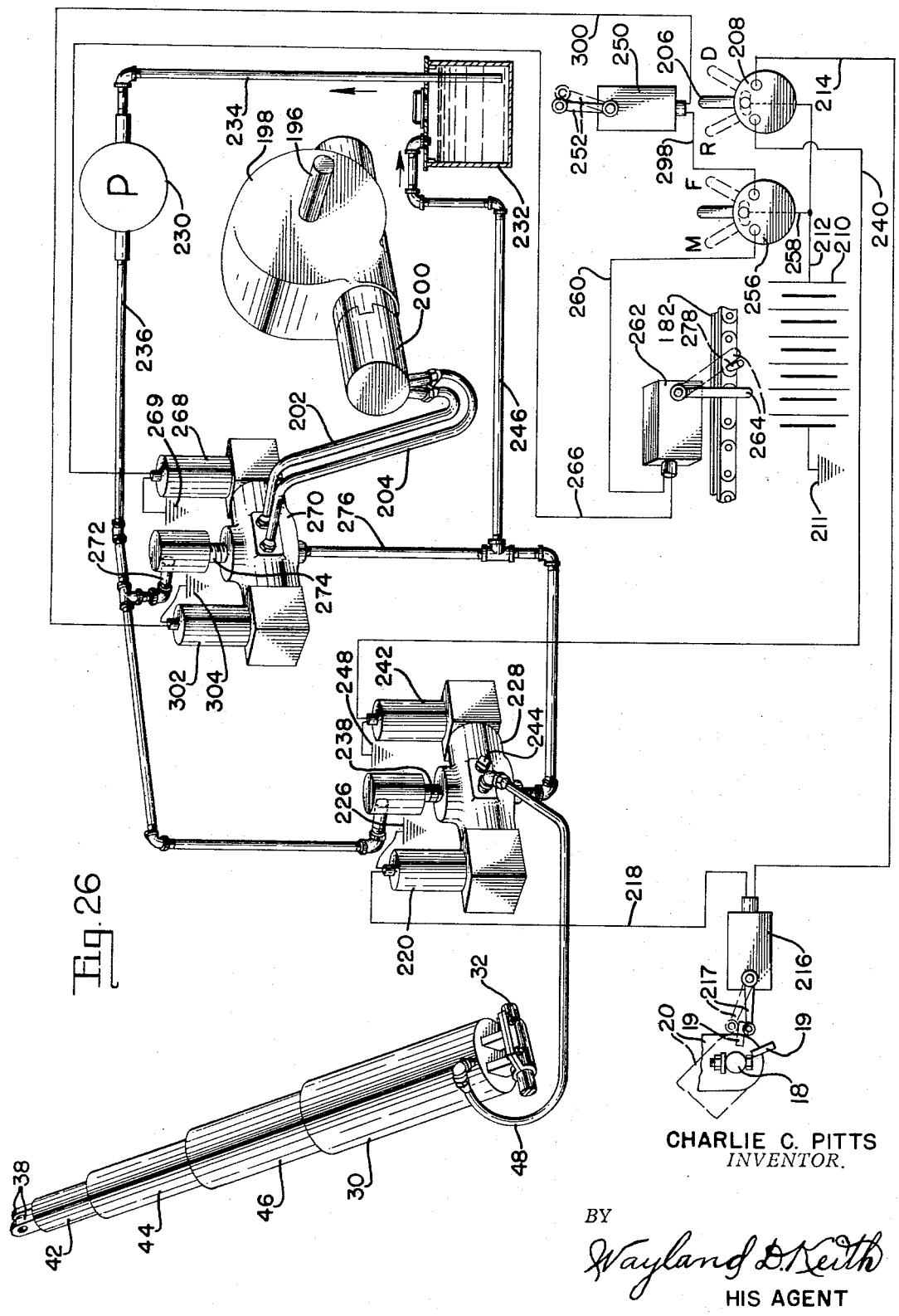

This invention relates to improvements in dump vehicles and more particularly to a dump trailer having a tandem body thereon, with a single dumping mechanism for dumping both of the bodies thereof.

Various dump vehicles have been proposed heretofore, but these, for the most part, utilized a single body with a single dumping mechanism, which is acceptable for vehicles with relatively short bodies; however, vehicles with longer bodies, such as dump bodies mounted on tandem trailers for carrying loads of large capacity, up to 70,000 or 80,000 pounds of granular or dumpable material, which necessitated bodies being as much as 30 to 35 feet in length, which, when elevated to approximately a 40 to 60 degree angle with respect to the horizontal, made the body extremely top heavy, and if the vehicle were not on a level foundation or on level terrain, or if the wind was high, the danger of tipping over was prevalent. In fact, many vehicles or trailers of such construction do tip over.

The present vehicle, which in the present instance is a trailer, is so designed that a relatively large load may be hauled in such manner as to get the maximum haulage advantage for the wheel base length of the trailer, and at the same time maintain the dumpable load in two separate boxes or compartments in such manner that these may be individually dumped, and the dumpable body, in dumping position, will be approximately one-half the height of a single body or box used to contain the entire amount of material.

An object of this invention is to provide a vehicle with dumping bodies arranged in tandem relation along the length of the frame thereof, both of which bodies may be elevated into a dumping position with a single dumping mechanism.

Another object of the invention is to provide an elongated vehicle having longitudinally spaced apart bodies thereon, one of which bodies may be telescoped into the other of said bodies so that the bodies may be selectively dumped by a single dumping mechanism.

Still another object of the invention is to provide a vehicle with an elongated frame having bodies thereon arranged in tandem, one of which bodies is selectively movable on the frame of said vehicle into the other of said bodies to enable both bodies to be simultaneously raised by a fluid cylinder.

Still a further object of the invention is to provide a vehicle with spaced apart frame members to form trackways for rollers to enable one of said bodies to be moved into the other of said bodies by power means.

Still another object of the invention is to provide a power means and transmission mechanism for moving one of said bodies into the other of said bodies, and to move the first of the bodies out of said last mentioned body by remote control.

And still a further object of the invention is to provide an electro-fluid control system that enables the moving of one of the tandem bodies into the other of the tandem bodies to a selected point by lifting the two bodies by a fluid cylinder to a given point, returning the lifted bodies to a normal position and returning the first mentioned body to a selected point without manual attention.

With these objects in mind and others which will become manifest as the description proceeds, reference is to be had to the accompanying drawings in which like reference characters designate like parts in the several views thereof, in which:

FIG. 1 is a side elevation view of a vehicle showing an embodiment of the invention thereon, with parts broken away and shortened, and with parts shown in alternate position in dashed outline;

FIG. 2 is a perspective view of the power drive mechanism shown apart from the vehicle with a portion of the vehicle frame shown in dashed outline;

FIG. 3 is a cross sectional view taken on line 3—3 of FIG. 4 looking in the direction indicated by the arrows;

FIG. 4 is a side elevational view of the trolley for moving the forward body along the frame of the vehicle and showing a fragmentary portion of the vehicle frame and transmission chain;

FIG. 5 is a side elevational view on a reduced scale of a truck with the tandem dump trailer attached thereto and showing the truck and trailer in transport position;

FIG. 6 is a side elevational view on a reduced scale of the truck and trailer shown in FIG. 5, but showing the rear body of the vehicle in dumping position;

FIG. 7 is a side elevational view on a reduced scale of the truck and trailer shown in FIG. 5, but showing the forward dump body slid into the rear dump body preparatory to dumping the contents of the forward dump body;

FIG. 8 is a view similar to FIG. 6, but showing the forward dump body telescoped into the rear dump body and being elevated into dumping position;

FIG. 9 is a longitudinal, sectional view on a reduced scale, through the tandem trailer bodies and showing a portion of a truck, and showing parts broken away and shortened;

FIG. 10 is an enlarged, detailed, sectional view of the rear portion of the trailer frame and showing a limit switch mounted thereon;

FIG. 11 is an enlarged, longitudinal, sectional view through an adjusting and locking mechanism, with parts broken away, of the rear portion of the front bed;

FIG. 12 is an enlarged, fragmentary view of the tail gate locking mechanism of the rear dump body on the trailer shown in full outline, with a portion of the trailer and frame thereof shown in dashed outline, with parts broken away and shortened to bring out the details of construction;

FIG. 13 is a view similar to FIG. 12, but of the forward dump body on the trailer with the operating mechanism shown in full outline in one position and in dashed outline in a second position;

FIG. 14 is a top plan view of the invention as shown in FIG. 1, but with portions broken away and shortened to bring out the details of construction;

FIG. 15 is an enlarged, fragmentary, sectional view through a portion of the frame of the trailer and through the body, and showing a roller mounted on the body with the roller being shown in elevation;

FIG. 16 is an enlarged sectional view taken on line 16—16 of FIG. 14, looking in the direction indicated by the arrows;

FIG. 17 is a sectional view taken on line 17—17 of FIG. 9 looking in the direction indicated by the arrows;

FIG. 18 is a sectional view taken on line 18—18 of FIG. 14 looking in the direction indicated by the arrows, but showing the forward dump body hauling mechanism in released position;

FIG. 19 is a fragmentary perspective view, partly in section, of a cushion bumper member positioned on the forward end of the forward dump body;

FIG. 20 is a sectional view taken on line 20—20 of FIG. 3 looking in the direction indicated by the arrows;

FIG. 21 is a rear elevational view of the trailer and rear dump body;

FIG. 22 is a sectional view taken on line 22—22 of FIG. 1 looking in the direction indicated by the arrows;

FIG. 23 is a sectional view taken on line 23—23 of FIG. 1 looking in the direction indicated by the arrows;

FIG. 24 is a sectional view taken on line 24—24 of FIG. 1 looking in the direction indicated by the arrows, except the portion of the truck and wheels thereof is shown in dashed outline;

FIG. 25 is a fragmentary sectional view taken on line 25—25 of FIG. 23 looking in the direction indicated by the arrows;

FIG. 26 is a diagrammatic view of the fluid and electrical system of the tandem body trailer with portions of the mechanism shown in perspective to bring out the details of construction, and with portions being shown in section;

FIG. 27 is a sectional view taken on line 27—27 of FIG. 14 looking in the direction indicated by the arrows; and FIG. 28 is a sectional view taken on line 28—28 of FIG. 13 looking in the direction indicated by the arrows.

With more detailed reference to the drawings, the numeral 1 designates generally a tractor vehicle for pulling trailers, which tractor vehicle 1 has the usual frame 2 and traction wheels 4 and steerable wheels 6. The tractor has a conventional fifth wheel 8 for attachment to a trailer designated generally by the numeral 10 in the conventional manner. The trailer 10 has an elongated frame 12 which has support wheels 14 on the rear thereof. The elongated frame 12 has a rear dump body 16 pivotally mounted on pivot pins 18, which pivot pins pass through apertured lugs 20 secured to the under side of rear dump body 16 and rotatable therewith. Lugs 22 are provided on and secured to the rear end of elongated frame 12 to enable the rear dump body 16 which in the present instance is a box-like body, to be pivotally attached thereto. The rear dump body 16 is seated on the rear portion of the elongated frame 12 within a recessed area 24 so that a track-way 26 secured to the upper face of the bottom portion of rear dump body 16 is flush with the upper face 28 of elongated frame 12 and in longitudinal alignment therewith.

A hydraulic cylinder 30 is pivotally mounted on a support shaft 32, which support shaft is supported on bracket 34 towards the forward end and below elongated frame 12. A telescoping plunger 42 extends from the other end of the hydraulic cylinder 30 and has a pivot pin 36 passing through lug 38 on the telescoping plunger 42 to pivotally connect the telescoping plunger to lugs 41 on the lower side of rear dump body 16. The hydraulic cylinder 30 has a conduit 48 connected to the lower end thereof to direct hydraulic fluid under pressure into the hydraulic cylinder 30 so as to cause the telescoping plungers 42, 44, and 46 to be extended in a manner so that the hydraulic plungers elevate the rear dump body 16 in the manner as will best be seen in FIGS. 6 and 8.

The rear dump body 16, when used for hauling granular or other dumpable particulate material, has upstanding sides 50, a forward end gate 52, and a rear end gate 54 which, when in closed position as indicated in FIGS. 1, 5, 9, 21, and 23, will hold such materials as grain, sand, gravel, rock, cement, and the like against leakage while being hauled over the terrain. This rear dump body 16 may hold from ten to fifteen yards of bulk material and may be readily dumpable by the actuation of hydraulic cylinder 30 urging the telescoping plunger 42, 44, and 46 outward in a manner well known in the art of fluid actuated hydraulic cylinders, and more particularly as shown in FIG. 26 and which will be more fully described hereinafter.

The rear end gate 54 of rear dump body 16 is held in closed position by hook-like lock members 56 engaging pins 58 on each side of the end gate 54 of the rear dump body 16, which hook-like lock members 56 are actuated by a tension bar 60 which is connected to a lever 62 by a bell crank 64 with a linkage 66 pivotally connected therebetween by pins 68 and 70. When the rear dump body 16 is raised by hydraulic cylinder 30, a spring 71 urges tension bar 60 rearward to move the hook-like lock members 56 into the released position as shown in dashed outline in FIG. 12. The bell crank 64 is pivotally mounted on a pivot pin 63.

The forward end gate 52 of the rear dump body 16 has pairs of apertured lugs 72 secured to the forward side thereof a spaced distance downward from the upper side thereof. Each side of the rear dump body 16 has upstanding posts 74 thereon, each of which posts has a forwardly extending apertured lug 76 thereon that receives a pin 78 therethrough and through an apertured lug 80 secured to the top of forward end gate 52. Each of the rollers 82 is journaled between pairs of apertured lugs 72.

The rear dump body 16 has the rear end gate 54 extending upward with a lug 84 on each side thereof, which lugs are apertured and receive pivot pins 86 therethrough and through apertured lugs 88 to permit the rear end gate 54 to swing about pivot pins 86 upon release of hook-like lock members 56 upon the rising of the rear dump body 16 by hydraulic cylyinder 30. The rear dump body 16 has a floor 17 therein to receive track-way 26 thereon.

The rear dump body 16 has a pair of guide members 90 to fit over upstanding members 92 so as to center the rear dump body 16 with respect to elongated frame 12. The guide members 90 are secured to the framework 94 of the rear dump body 16, as will best be seen in FIGS. 9 and 17.

The elongated frame 12 has a forward dump body 100 movably mounted thereon, which forward dump body is supported on spaced apart rollers 102 mounted on shafts 104, which shafts are mounted in apertured lugs 106 on the lower framework 108 of the forward dump body 100.

The spaced apart rollers 102 have flanges 103 thereon, as will best be seen in FIG. 15, which rollers are adapted to be fitted in guided, rolling relation on the upper face 28 of elongated frame 12 and upon the track-way 26, as will be more fully brought out hereinafter. The forward dump body 100 has a forward end 109 therein, which joins with upstanding sides 110 to form a box-like forward dump body 100 with a floor 112 therein. The rear end of the forward dump body 100 has a rear end gate 114 pivotally supported on the rear of forward dump body 100 by pivot pins 116 passing through lugs 118 on the rear end of the forward dump body and secured within the rear end gate 114. A roller 120 is positioned on each side of the forward dump body 100 near the top thereof, which rollers 120 are spaced apart to be in register with rollers 82 on the forward end gate 52 of the rear dump body 16 when the forward dump body 100 is moved along the upper face 28 of the elongated frame 12.

The trailer 10 has a rear dump body 16 and a forward dump body 100 mounted thereon with the rear dump body 16 capable of hauling a load of material, usually ten to fifteen yards of dumpable particulate material, and is pivotally mounted on a pivot pin 18 so as to be raised by a hydraulic cylinder 30 having telescoping plungers 42, 44 and 46 therein; however, the rear dump body 16 is normally seated within recessed area 24 on elongated frame 12, as will best be seen in FIGS. 1, 5, 7, and 9. A forward dump body 100, which may be of a character to haul from ten to fifteen yards of dumpable material, is normally positioned on the forward end of elongated frame 12 and is movably mounted thereon to enable the forward dump body 100 to be moved longitudinally along elongated frame 12 as will be more fully set forth hereinafter.

With the rear dump body 16 and the forward dump body 100 each loaded with dumpable material, the rear dump body 16 is elevated into position as shown in FIG. 6 by hydraulic cylinder 30 and telescoping plungers 42, 44, and 46, to unload the rear dump body 16.

The rear end gate 114 is in abutting relation with the rear end of forward dump body 100; and when the forward dump body 100 is moved rearwardly along the upper face 28 of elongated frame 12, outstanding flanges 130 on the rear end of the forward dump body 100 move the forward end gate 52 of the rear dump body 16 upward from the position indicated in full outline in FIG. 1 to the position indicated in dashed outline therein. However, as the body moves rearward, as will be more fully brought out hereinafter, with the roller 120 engaging rollers 82, the rollers 82 are then transferred in rolling relation with the top face 111 of upstanding sides 110, which will permit the forward dump body 100, as indicated in dashed outline in FIG. 1, to move into telescoped relation with the rear dump body 16.

In transporting the trailer 10 over the terrain, the rear dump body 16 and the forward dump body 100 will be maintained in the position as shown in FIGS. 1, 5, 9, and 14, that is, with the rear dump body 16 being maintained, by the weight of gravity, in seated relation on the elongated frame 12. The forward dump body 100 occupies a position near the forward end of elongated frame 12 and has a recessed abutment 122 secured on the forward end thereof, as by welding, which recessed abutment 122 is preferably conical and is adapted to complementally engage a conical abutment member 124 secured to the cross member 13 which extends between the elongated members of the elongated frame 12.

When the forward dump body 100 is in the position in FIGS. 1, 5, 9, and 14, a toggle action lock member, generally designated by the numeral 126, as will best be seen in FIGS. 9, 14, and 18, is mounted on cross members 127 and 128 which extend between the elongated members of the elongated frame 12. The toggle action lock member 126 comprises a bell crank 132 to which is pivotally attached a linkage 134, which linkage is also pivotally attached to a lever 136 that is secured to a shaft 138, the outer end of which shaft 138 has a lever 140 secured thereto. The bell crank 132 is pivotally connected to an apertured lug 142 and the opposite end of the bell crank 132 is pivotally connected to a linkage 144. An outwardly extending finger 146 on bell crank 132 is adapted to engage an abutment 148 on linkage 144, when the outwardly extending finger 146 is in one position. The linkage 144 is pivotally connected to a lever 150 which is secured to a shaft 152 which extends transversely of the frame of the trailer 10 and which shaft 152 has a pair of recessed abutments 154 thereon to complementally engage adjustable conical members 156 (FIGS. 11 and 18) which are secured to the rear end of the forward dump body 100. The toggle action lock member 126, when in the position indicated in full outline in FIG. 18, creates an "over center" toggle action to urge the recessed abutment 154 into complementary engagement with the adjustable conical members 156, which will hold the forward dump body 100 in binding engagement with the conical abutment member 124 on the elongated frame 12.

The adjustable conical member 156 is shown on an enlarged scale in FIG. 11, whereby a socket 158 receives the adjustable conical member 156 therein, which socket has a threaded portion to receive a screwthreaded set screw 160 therethrough, which set screw 160 may be locked in position by a nut 162 which enables the toggle action lock member 126 to be so adjusted as to compensate for wear.

By moving the lever 140 from the position as shown in full outline in FIGS. 9 and 18 to the position as shown in dashed outline in FIG. 18 and as shown in full outline in FIG. 14, the linkage 134 will move bell crank 132 to the position as shown in dashed outline, with linkage 144 and lever 150 being moved to the position indicated, which, in turn, will move the recessed abutment 154 out of engagement with adjustable conical members 156, whereupon the forward dump body 100 may be selectively moved along the upper face 28 of the elongated frame 12, on spaced apart rollers 102 by a power driven chain conveyor mechanism generally designated by the numeral 164.

The power driven chain conveyor mechanism 164 has a pair of spaced apart idler sprockets 166 and 168 mounted on the elongated frame 12 in journaled relation with the idler sprocket 168 being located near the forward end of one of the members of the elongated frame 12 and the idler sprocket 166 being located in close proximity to the forward end of the rear dump body 16. A roller supported trolley member, generally designated by the numeral 170, as will best be seen in FIGS. 1, 2, 3, and 4, is positioned on the upper face 28 of one of the members of the elongated frame 12, which roller supported trolley member 170 has support rollers 172 journaled on horizontal axes to support the trolley member 170, which trolley member is bifurcated as indicated at 174 to receive one of the transverse members of the lower framework 108 of forward dump body 100, as will best be seen in FIGS. 1 and 13. The roller supported trolley member 170 is freely movable along the upper face 28 of one of the members of the elongated frame 12, and it is guided against lateral movement by rollers 176 and 178. Further rollers 180 are positioned below the flange of one of the elongated members of the elongated frame 12 so that the roller supported trolley member 170 is in true, longitudinal, guided relation with respect to one of the elongated members of the elongated frame 12. The upper face of the bifurcation 174 slopes upwardly and outwardly to guide one of the transverse members of the lower framework 108 of the forward dump body 100 thereinto. A roller chain 182 is attached to the lower side of the roller supported trolley member 170 and extends outwardly therefrom to form an endless drive chain to surround spaced apart idler sprockets 166, 168, 184, and 186. A drive sprocket 190 is maintained in meshed driving relation with roller chain 182 by idler sprockets 184 and 186, with the idler sprocket 184 being adjustably positioned on a slide member 192, which slide member is urged inwardly by a wing screw 194 to cause engagement of idler sprocket 184 with roller chain 182.

The drive sprocket 190 is mounted on a shaft 196 which extends outward from a gear mechanism 198 which is connected in driven relation with a fluid power motor 200. The fluid power motor 200 has conduits 202 and 204 connected thereto as is best illustrated, diagrammatically, in FIG. 26. In the present instance the fluid is shown to be hydraulic; however, any source of power such as air or electrical power is to be considered within the scope and intent of the invention.

With the rear dump body 16 in the position as shown in FIGS. 1, 5, 9, and 14, and filled with a flowable, dumpable material, and with the forward dump body 100 in the position as shown in FIGS. 1, 5, 9, and 14, and filled with flowable, dumpable material, a lever 206 of double throw switch 208 is moved from the position as shown in full outline in FIG. 26 to the right as shown at D, in dashed outline therein, which movement of lever 206 will close the circuit from battery 210, through conductor wire 212, through double throw switch 208, into wire 214 which leads to normally closed limit switch 216 mounted on the rear portion of elongated frame 12. With the normally closed limit switch 216 in the position as shown in full outline in FIG. 26, it will be closed, which will direct current therethrough into wire 218 leading to solenoid coil 220, and through the coil to a ground 226 and return to ground 211 on the battery 210, which will actuate a solenoid armature in solenoid coil 220 (not shown) which, in turn, will move a valve element (not shown) within the four-way solenoid actuated valve 228 into a position to cause the pump 230 to withdraw hydraulic fluid from reservoir 232 into conduit 235 and thence to discharge into conduit 236 and thence into inlet conduit 238 of four-way solenoid actuated valve 228. With the valve passages within the four-way solenoid actuated valve 228 open to connect inlet conduit 238 with conduit 48, hydraulic fluid will be directed into the lower end of hydraulic cylinder 30, which will cause telescoping plungers 42, 44, and 46 to extend (as indicated in FIG. 26). The telescoping plunger 42 within hydraulic cylinder 30 is pivotally connected to the forward portion of the rear dump body 16, and as tescoping plungers 42, 44, and 46 raise the forward portion of the rear dump body 16, the lever 62 will move about the axis of pivot pin 63 by action of spring 71, which spring will move tension bar 60 to actuate hook-like lock members 56 which will release hook-like lock members 56 from pins 58 on the rear end gate 54 to release the rear end gate 54 of the rear dump body 16, which will permit the dumpable material within the rear dump body 16 to be discharged through the rear end of the rear dump body 16 in a manner clearly shown in FIG. 6.

Upon the rear dump body 16 being elevated to a predetermined angle, the pivot pin 18, as shown in FIGS. 1 and 26, will be rotated therewith through a predetermined arc so that an outwardly extending lug 19 or lug 20 will engage a roller on arm 217 to move the arm from the position indicated in full outline in FIG. 26 to that indicated in dashed outline therein; whereupon, a contact will be broken in the normally closed limit switch 216 which will open the circuit between double throw switch 208 and solenoid coil 220 which will deenergize the armature (not shown) in solenoid coil 220 which will cause the valve element in the four-way solenoid actuated valve 228 to move into position to by-pass fluid from conduit 236, through four-way solenoid actuated valve 228, into discharge conduit 246 leading to the reservoir 232. This will limit the raising of the rear dump body 16 beyond a predetermined height, as would cause damage thereto or make the load top-heavy.

Upon completing the dumping action of the rear dump body 16, the lever 206 of double throw switch 208 is moved from the "dumping" position as indicated at D in FIG. 26, to the "release" position as indicated in dashed outline at R on the left side of the double throw switch 208 in FIG. 26. In so doing, the circuit through wire 214 is opened and the circuit is closed between the battery 210 through conductor wire 212, through double throw switch 208, into wire 240 which leads to solenoid coil 242 on the four-way solenoid actuated valve 228, to ground 248, thence to ground 211 of battery 210 to complete the circuit. By utilizing a four-way solenoid actuated valve 228 to perform this function, the discharge port in the four-way solenoid actuated valve 228 is plugged by plug 244. Therefore, the center passage through which fluid from conduit 48 is released into discharge conduit 246, is blocked. Upon energizing solenoid coil 242, current passing through wire 240, through solenoid coil 242 to actuate an armature therein (not shown), the current will flow to ground 248. The actuated armature (not shown) will then move a valve element (not shown) within four-way solenoid actuated valve 228 which will open a passage between conduit 48 and discharge conduit 246, which discharge conduit forms a return pipe to reservoir 232; whereupon, the telescoping plungers 42, 44, and 46 will be telescoped into hydraulic cylinder 30 under the weight exerted by the rear dump body 16. Upon the rear end gate 54 swinging into place due to the pivot pins 86 being located off center, the hook-like lock members 56 will engage pins 58 on the rear end gate 54 to close the rear end gate in the same manner as before the rear dump body 16 was elevated.

It is to be pointed out that the rear dump body 16 is of a minimum height, and when elevated to the upmost position, it is sufficiently stable, even on sloping ground, that it will not tip over when being elevated to a dumping position. However, by arranging the two loaded bodies in tandem relation, that is, of rear dump body 16 and forward dump body 100, each of which bodies is of relatively short length, both may be dumped by a single cylinder and plunger dumping arrangement which presents a minimum of hazard in the dumping of heavy loads.

With the forward dump body 100 filled with a dumpable material, the toggle action lock member 126 is moved from the locked position, shown in full outline in FIGS. 1 and 18, to the released position, as shown in dashed outline in FIG. 18; whereupon, the recessed abutment 154 will be moved to a point below and out of the line of movement of the adjustable conical abutment 156, or any portion of the forward dump body 100, when the dump body is moved along the upper face 28 of the elongated frame 12.

When it is desired to dump the material from the forward dump body 100, the switch lever 254 of double throw switch 256 is moved from the "off" position indicated in full outline in FIG. 26, to the position indicated by M, which will close the circuit from battery 210 through conductor wire 212, through conductor wire 258, through double throw switch 256, through wire 260, and with the normally closed limit switch 262 having the arm 264 in the position indicated in full outline in FIG. 26, current will flow through the normally closed limit switch 262 to conductor wire 266 to solenoid coil 268, and thence to ground 269, to actuate an armature (not shown) within solenoid coil 268. This, in turn, will actuate a valve element (not shown) in four-way solenoid actuated valve 270 which will move the valve element into position to direct hydraulic fluid from conduit 236, through conduit 272, into inlet conduit 274 of four-way solenoid actuated valve 270, into and through conduit 202 leading to fluid powered motor 200, the pressure of which fluid rotates the motor and gear reduction therein to rotate shaft 196. The hydraulic fluid is discharged through conduit 204, into and through four-way solenoid actuated valve 270, into discharge conduit 276 which interconnects with discharge conduit 246 leading to the reservoir 232; whereupon the shaft 196 is rotated in counter-clockwise direction and with the drive sprocket 190 in mesh with roller chain 182, the roller supported trolley member 170, to which the roller chain 182 is attached, is moved rearwardly, and with the lower framework 108 being in engaged relation with the bifurcation 174 of the roller supported trolley member 170, as will best be seen in FIGS. 1, 14, and 24, the forward dump body 100 is moved from the position indicated in full outline in FIGS. 1 and 5, to the position indicated in dashed outline in FIG. 1, and in full outline in FIG. 7.

As the movement of the forward dump body 100 continues along the upper face 28 of the elongated frame 12, the roller chain 182 will move in a circuitous path on idler sprockets 166, 168, 184, and 186, and below drive sprocket 190 which will, in turn, move an outwardly projecting pin 278 on the roller chain 182 from the position indicated in full outline in FIGS. 1 and 2, to the position indicated in dashed outline in FIG. 26; whereupon, the arm 264 of normally closed limit switch 262 will be moved by outwardly projecting pin 278 from the position indicated in full outline to that indicated in dashed outline in FIG. 26, which will open the circuit between the double throw switch 256 and solenoid coil 268 which will deenergize the solenoid coil 268 which will permit the valve element (not shown) in four-way solenoid actuated valve 270 to move into a position to by-pass hydraulic fluid from conduit 236, through conduit 272, through four-way solenoid actuated valve 270, into discharge conduit 276, and thence into discharge conduit 246 into reservoir 232, which will arrest the rearward movement of the forward dump body 100 as indicated in dashed outline in FIG. 1 and in full outline as shown in FIG. 7.

As hereinbefore set forth, the forward end gate 52 of the rear dump body 16 will be moved from the position as indicated in full outline in FIGS. 1 and 5, to the position as indicated in dashed outline in FIG. 1 and in full outline in FIG. 7, whereby the loaded forward dump body 100 will be positioned on track-way 26 within the rear dump body 16. However, the rear end gate 54 of the rear dump body 16 will be held in closed position by hook-like lock members 56 as hereinbefore set forth.

Similar hook-like lock members 280 are pivotally mounted on the rear portion of the forward dump body 100 and are adapted to engage outwardly extending pins 282 on the rear end gate 114 of the forward dump body 100. However, the hook-like lock members 280 are held in engaged position with outwardly extending pins 282 by tension exerted on rod 284 connected to the hook-like lock members 280 and to a single-tree lever 286, which lever is pivotally mounted near the forward dump body 100, which single-tree lever 286 has a rod 288 pivotally connected thereto and to a bell crank 290, which bell crank is pivotally mounted near the forward end of the forward dump body 100 on a shaft 292, with the other lever portion 294 of the bell crank 290 resting on the upper face 28 of one of the elongated members of the elongated frame 12 so as to maintain the hook-like lock members 280 in engaged position against tension of spring 296. The spring 296 is in bearing relation against one of the frame members of the lower framework 108 of the forward dump body 100 and is attached to rod 284, so upon the raising of the rear dump body 16 by hydraulic cylinder 30 and telescoping plungers 42, 44, and 46, the bell crank levers 62 and 294 will move out of engagement with the elongated frame 12, as indicated in FIG. 8, which will release the rear end gate 54 of the rear dump body 16 and the rear end gate 114 of the forward dump body 100; whereupon, the dumpable material in forward dump body 100 will be discharged.

Upon raising the rear dump body 16 and the forward dump body 100 by hydraulic cylinder 30 and telescoping plungers 42, 44, and 46, the forward end of the forward dump body 100 will be moved out of engagement with bifurcation 174 of the roller supported trolley member 170, to disconnect the roller supported trolley member 170.

With the material discharged from forward dump body 100, the lever 206 of the double throw switch 208 is moved from the position as indicated at R in FIG. 26, to the position indicated at D therein; whereupon, the rear dump body 16 is moved downward into seated relation as indicated in FIG. 7, by the release of fluid from hydraulic cylinder 30 due to the energization of solenoid coil 242 which directs the hydraulic fluid from the hydraulic cylinder 30 into conduit 48, through four-way solenoid actuated valve 228, into discharge conduit 246 in the manner hereinbefore set forth. With the rear dump body 16 and the forward dump body 100 in the position as shown in FIG. 7, the lever 206 of double throw switch 208 may be moved into the position indicated in full outline in FIG. 26; whereupon, both wires 214 and 240 which lead from the double throw switch 208, will be deenergized.

With the forward dump body 100 in the position as indicated in FIG. 7, the switch lever 254 may be moved from the position indicated at M in FIG. 26, to that indicated in dashed outline at F therein; whereupon, the current will be directed from battery 210 through conductor wire 212, through conductor wire 258, through double throw switch 256, through conductor wire 298, into and through normally closed limit switch 250, and into conductor wire 300, to solenoid coil 302, and through the solenoid coil 302 to ground 304 to energize the solenoid coil to actuate an armature therein (not shown). The movement of the armature in solenoid coil 302 will actuate the valve element in four-way solenoid actuated valve 270 to direct hydraulic fluid from reservoir 232 upward through conduit 234, pump 230, conduit 236, into conduit 272, thence into inlet conduit 274, and through a valve member (not shown) within the four-way solenoid actuated valve 270 into conduit 204 with the discharge fluid being returned through conduit 202, into and through fluid power motor 200, into solenoid actuated four-way valve 270, through a valve member therein (not shown), to discharge out through discharge conduit 276, into discharge conduit 246 into reservoir 232, to rotate shaft 196 in clockwise direction. The rotation of shaft 196 and the drive sprocket 190 secured thereto and in mesh with roller chain 182, will move the roller chain 182, the upper reach of which chain is supported by a series of spaced apart rollers 183 which are mounted on the elongated frame 12 and which rollers are positioned thereunder to support the roller chain 182 thereon, in a circuitous path around idler sprockets 166, 168, 184, and 186. The movement of the chain will move outwardly projecting pin 278 from the position, shown in dashed outline in FIG. 26, to the position as shown in full outline in FIGS. 1 and 2. Upon moving out of engagement with lever 264, the outwardly projecting pin 278 will permit the lever 264 of the normally closed limit switch 262 to swing from the dashed outline position to the full outline position as indicated in FIG. 26, which will close the contacts in the normally closed limit switch 262, to move the forward dump body 100 forward into the position as shown in FIGS. 1, 5, 9, and 14.

Upon forward movement of the forward dump body 100, the forward end of the body will contact switch arm 252 of the normally closed limit switch 250, which will move the switch arm 252 into the position as indicated in dashed outline in FIG. 26, to open the normally closed limit switch 250 which is in series with one portion of the double throw switch 256, which will cause solenoid coil 268 to be deenergized to move the valve element (not shown) within four-way solenoid actuated valve 270 to a position to by-pass hydraulic fluid from conduit 236, through conduit 272, into inlet conduit 274, to pass the hydraulic fluid in by-pass relation through four-way solenoid actuated valve 270 into the discharge conduit 276 and thence into discharge conduit 246 leading to reservoir 232. As the forward dump body 100 moves the switch arm 252 into the position indicated in dashed outline in FIG. 26, the hydraulic fluid being diverted from fluid power motor 200 through four-way solenoid actuated valve 270 will be by-passed and the forward movement of the roller supported trolley member 170 connected to the roller chain 182 will be arrested, which in turn will arrest the forward movement of the forward dump body 100.

With the rear dump body 16 in the position as shown in full outline in FIGS. 1, 5, 9 and 14 and with the forward dump body 100 in the position as shown in FIG. 14, the toggle action lock member 126 is locked by moving lever 140 from the position shown in dashed outline in FIG. 18 and in full outline in FIG. 14, to that shown in full outline in FIGS. 1, 5, and 9, which will hold the forward dump body 100 in abutting relation with conical abutment member 124 with the recessed abutment 122 in complementary engagement therewith.

Forwardly facing elastomer bumpers 306, one of which is shown in FIG. 19, are mounted on a bracket 307. Two brackets 307 are shown in FIG. 24 as being mounted on the lower side of the lower framework 108, near the forward end of the forward dump body 100. The brackets 307 are secured to a transverse member on lower framework 108 on the outside of the elongated frame 12, and extend downwardly so the elastomer bumpers 306 will abut with the forward transverse member of the framework 94 on the forward end of the rear dump body 16 when the forward dump body 100 is in the rearmost position.

The forward end gate 52 of the rear dump body 16 has elastomer seals 308 and 310 secured to the lower side thereof, so when the forward end gate 52 swings into vertical position, the elastomer seal 308 will form a barrier to prevent dumpable material passing beneath the forward end gate 52, as will best be seen in FIG. 9. The rear dump body 16 has an inwardly extending flange 312 on each side of the upstanding sides 50, as will best be seen in FIGS. 23, 24, and 25, for the forward end gate 52 to swing thereagainst to form a positive stop therefor and to form a seal to prevent dumpable material passing outward thereby. The rear end gate 54 fits in abutting relation with the rear face of the upstanding sides 50 and the floor 17 of the rear dump body 16 and is held in place by hook-like lock members 56 as hereinbefore set forth to retain dumpable material in the rear dump body 16.

The forward end 109 of the forward dump body 100 has vertical braces 314 and a horizontal brace 316 secured thereto to maintain the forward end 109 in braced relation with respect to the upstanding sides 110 of the forward dump body 100.

The rear end gate 54 of the rear dump body 16 has a chain 318 welded or otherwise secured on each side of the rear end gate 54 near the lower side thereof, which chain 318 is of a length to extend laterally outward through a modified key-hole slot 320 which is formed in a brace 322 secured to each upstanding side 50 of the rear dump body 16 and to a diverter plate 324. In event that the hook-like lock members 56 should accidentally become disengaged from outwardly extending pins 58 on the rear end gate 54, the chain 318 will prevent loss of load within the rear dump body 16.

While the invention has been illustrated and described in some detail in one embodiment thereof, it is to be understood that changes may be made in the details of construction and adaptations made to different installations without departing from the spirit of the invention and the scope of the appended claims.

Having thus clearly shown and described the invention, what is claimed as new and desired to be secured by Letters Patent is:

1. A dumping vehicle comprising:
   (a) an elongated frame,
   (b) a rear dump body pivotally mounted on said elongated frame near the rear end thereof and having an upstanding wall on each side of said rear dump body,
   (c) a trackway associated with the forward end of said elongated frame and extending within said rear dump body,
   (d) a forward dump body spaced forwardly from said rear dump body and movably mounted on said trackway,
      (1) spaced apart rollers mounted on the lower side of said forward dump body and being in rolling relation with said trackway on said elongated frame,
   (e) a first power actuated means associated with said elongated frame and with said forward dump body for moving said forward dump body along said trackway relative to and within said rear dump body, and
   (f) a fluid actuated power means associated with said elongated frame and said rear dump body to pivot said rear dump body relative to said elongated frame.

2. A dumping vehicle as defined in claim 1 wherein:
   (a) the upper face of the said elongated frame forms said trackway, and
   (b) a second trackway within said rear dump body lying in substantially the same horizontal plane with the face of said trackway formed on said elongated frame.

3. A dumping vehicle as defined in claim 2 wherein:
   (a) said elongated frame has the upper, rear portion thereof recessed to receive a portion of said rear dump body therein in seated relation, and
   (b) said trackway in said rear dump body is adapted to lie in the same horizontal plane as the trackway on the upper face of the adjacent portion of said elongated frame.

4. A dumping vehicle as defined in claim 1 wherein:
   (a) said first power actuated power means associated with said elongated frame and said forward dump body includes,
      (1) spaced apart idler sprockets,
      (2) a chain surrounding said idler sprockets,
      (3) said trackway associated with said elongated frame, being the upper face of said elongated frame,
      (4) a roller supported trolley member mounted on said trackway on said elongated frame and having said chain connected thereto,
      (5) a drive sprocket associated with said chain and said spaced apart idler sprockets to form a driving connection between said first fluid actuated power means and said trolley member to move said trolley member along said elongated frame,
   (b) said trolley member having a bifurcation formed in the upper side thereof, and
   (c) said forward dump body being selectively engageable within said bifurcation in said trolley member.

5. A dumping vehicle as defined in claim 4 wherein there is provided:
   (a) a source of fluid pressure,
   (b) a conduit leading from said source of fluid pressure to said first power actuated means,
   (c) a solenoid valve within said conduit,
      (1) a solenoid coil on said solenoid valve,
   (d) a limit switch,
      (1) an actuator associated with said limit switch,
   (e) a manually operated switch,
   (f) a source of electricity,
   (g) an electrical circuit which includes said limit switch, said solenoid coil, said manually operated switch, and said source of electricity, and
   (h) abutment means on said chain to selectively engage said actuator on said limit switch to actuate said solenoid valve to limit the forward movement of said trolley member with which said forward dump body is engaged.

6. A dumping vehicle as defined in claim 4 wherein:
   (a) said trackway on said elongated frame is a member with out-turned flanges thereon,
   (b) said rollers mounted on said roller supported trolley member are pairs of spaced apart rollers which engage the upper face of said flanged member for rolling movement longitudinally thereof,
   (c) further rollers mounted on said trolley member in opposed relation to said first mentioned roller members and in bearing relation with the lower face of said out-turned flanges of said elongated frame,
   (d) still further rollers mounted on said trolley member for rotation about a vertical axis and engaging said flanged member at a right angle to said first mentioned rollers of said trolley member so as to maintain said trolley member in fixed relation against lateral movement with respect to said flanged member, and
   (e) apertured lugs on said trolley member which lugs are in aligned relation for connection of said chain thereto.

7. A dumping vehicle as defined in claim 4 wherein:
   (a) one of said idler sprockets is mounted on a slide member on said elongated frame to adjustably engage said chain, and
   (b) screw means associated with said slide member to adjust the engagement of said slide member to urge said idler sprocket into engagement with said chain.

8. A dumping vehicle as defined in claim 1 wherein:
   (a) said rear dump body has a rear end gate pivotally mounted thereon,
   (b) said rear dump body has a forward end gate pivotally mounted on the forward end thereof,
   (c) hook-like lock members adapted to selectively secure said rear end gate of said rear dump body in fixed relation with respect thereto, (d) said forward end of said rear dump body having an abutment means thereon to restrain said forward end gate from pivotally swinging forwardly of the forward end of said rear dump body, and (e) release means associated with said rear dump body and with said elongated frame to actuate said hook-like lock members upon relative movement between said rear dump body and said elongated frame.

9. A dumping vehicle as defined in claim 8 wherein:
(a) the rear end of said forward dump body selectively engages the forward end gate of the said rear dump body upon rearward movement thereof, so said forward dump body will move onto said rear dump body, and
(b) said fluid actuated power means, for pivotally moving said rear dump body, is adapted to pivotally elevate both dump bodies simultaneously relative to said elongated frame when said forward dump body is in one position.

10. A dumping vehicle as defined in claim 8 wherein:
(a) the forward side of said forward end gate of said rear dump body has a pair of spaced apart rollers mounted thereon, the axes thereof being substantially parallel with the pivotal axis of said forward end gate of said rear dump body, and
(b) said rear end of said forward dump body having spaced apart rollers mounted thereon near the top thereof,
(1) said rollers on said rear end of said forward dump body being adapted to register with said spaced apart rollers on the forward side of the forward end gate of said rear dump body, so upon rearward movement of said forward dump body, said rollers on said forward end gate of said rear dump body will engage rollers on said forward dump body, and will roll onto the upper sides of said forward dump body, which sides are in alignment with said rollers on the forward side of the forward end gate of said rear dump body so as to hold said forward end gate of said rear dump body in supported relation during relative movement of said forward dump body with respect to said rear dump body.

11. A dumping vehicle as defined in claim 9 wherein:
(a) said elongated frame has a stop means associated with the forward end thereof, and
(1) said forward dump body is adapted to selectively engage said stop means.

12. A dumping vehicle as defined in claim 9 wherein:
(a) said forward dump body has a lever pivotally mounted thereon near the forward end thereof, which lever is engageable with the face of said trackway,
(b) a longitudinally movable member operatively associated with said lever and with said hook-like lock members on the rear end of said forward dump body, and
(c) said lever on the forward end of said forward dump body being adapted to move downward upon said forward dump body being raised to release said hook-like lock members from said rear end gate of said forward dump body.

13. A dumping vehicle as defined in claim 11 wherein:
(a) said stop means associated with said elongated frame and engageable by said forward dump body, is a limit switch,
(b) a source of hydraulic pressure,
(c) a conduit leading from said source of hydraulic pressure to said first fluid actuated power means,
(d) a solenoid valve within said conduit which leads from said source of fluid pressure to said first fluid actuated power means,
(e) a source of electricity,
(f) a manually operated switch,
(g) an electrical circuit including said limit switch, said manually operated switch, said solenoid of said solenoid actuated valve, and said source of electricity, and
(1) said limit switch being adapted to be opened by the forward movement of said forward dump body thereby to break said electrical circuit.

14. A dumping vehicle as defined in claim 13 wherein:
(a) said pivotal mounting of said rear dump body on the rear end of said elongated frame is fixedly secured to said rear dump body and rotatable therewith,
(1) an abutment secured to and extending outwardly from one of said lugs on the rear of said rear dump body being arcuately movable therewith, and
(b) said limit having an actuator thereon, which is in the path of movement with said outwardly extending abutment so as to break the circuit leading to said solenoid valve to limit the upward, pivotal movement of said rear dump body.

15. A dumping vehicle as defined in claim 1 wherein:
(a) stop means is associated with said rear dump body and said elongated frame to limit the upward, pivotal movement of said rear dump body, and
(b) release means is provided to selectively release said rear dump body, when in the uppermost position, to permit said body to return to a horizontal position by the force of gravity.

16. A dumping vehicle as defined in claim 15 wherein:
(a) said stop means, associated with said rear dump body and said elongated frame to limit the upward, pivotal movement of said rear dump body, is a limit switch,
(b) a source of fluid pressure,
(c) a conduit leading from said source of fluid pressure to said fluid actuated power means,
(d) a solenoid valve within said conduit leads from said source of fluid pressure to said fluid actuated power means,
(e) a source of electricity,
(f) a manually operated switch,
(g) an electrical circuit including said limit switch, said manually operated switch, said solenoid of said solenoid valve, and said source of electricity, and
(1) said limit switch being adapted to be opened upon a predetermined, upward, pivotal movement of said rear dump body in relation to said elongated frame.

17. A dumping vehicle as defined in claim 1 wherein:
(a) an abutment is formed on the forward end of said elongated frame,
(b) an abutment is formed on the forward end of said forward dump body, which is adapted to complementally register with said abutment on said elongated frame,
(c) an abutment formed on the rear of said forward dump body, and
(d) a toggle action mechanism mounted on said elongated frame, including an abutment thereon, to complementally engage said abutment on the rear end of said forward dump body to hold said forward dump body against movement on said trackway.

18. A dumping vehicle as defined in claim 17 wherein:
(a) said abutment on the rear end of said forward dump body is conical, which abutment is movable with respect thereto,
(b) screw means associated with said body, which screw means moves said conical abutment, and
(c) said abutment on said toggle action mechanism having a face thereof complementally engageable with said conical abutment on the rear end of said forward dump body.

19. A dumping vehicle as defined in claim 1 wherein:
(a) guide members are mounted on said elongated frame below said rear dump body, and
(1) a complementary guide means is mounted on said rear dump body and is complementally engageable with said guide members on said elongated frame to maintain said rear dump body against lateral movement with respect to said guides when said guide members and said guide means are in engaged relation.

20. A dumping vehicle as defined in claim 1 wherein:
(a) an end gate pivotally mounted in the forward end of said rear dump body near the top of said walls and adjoining the forward ends of said upstanding walls,
   (1) abutments on the forward end of said rear dump body to restrain said forward end gate of said rear dump body against outward movement with respect thereto,
(b) said rear dump body having an end gate pivotally mounted near the top of said upstanding walls thereof at the rear end of said rear dump body,
   (1) lock means on said dump body to releasably engage said rear end gate when said rear dump body is in one position,
   (2) release means associated with said rear dump body and said elongated frame to release said rear end gate of said rear dump body upon elevation of said rear dump body,
(c) an upstanding wall on each side of said forward dump body,
(d) said forward dump body has an upstanding end in the forward end thereof and joining said upstanding walls,
(e) an end gate pivotally mounted near the top of said upstanding walls at the rear of said forward dump body,
   (1) lock means on said forward dump body to normally secure said rear end gate of said forward body in closed relation, and
   (2) release means associated with said forward dump body and said elongated frame to release said rear end gate of said forward dump body elevation of said rear dump body.

21. A dumping vehicle as defined in claim 20 wherein:
(a) said forward dump body is movable on said trackway below said forward end gate of said rear dump body to be in telescoping relation with said rear dump body and in position to be dumped upon elevation of said rear dump body.

References Cited
UNITED STATES PATENTS

| | | | |
|---|---|---|---|
| 1,195,519 | 8/1916 | Sior | 298—14 |
| 1,288,175 | 12/1918 | Pittman. | |
| 1,530,124 | 3/1925 | Kautz | 214—83.24 |
| 2,663,439 | 12/1953 | Phelps | 214—83.24 |
| 2,741,383 | 4/1956 | Leckert. | |
| 3,001,825 | 9/1961 | Rouse | 298—8 |

RICHARD J. JOHNSON, *Primary Examiner.*